Patented July 29, 1947

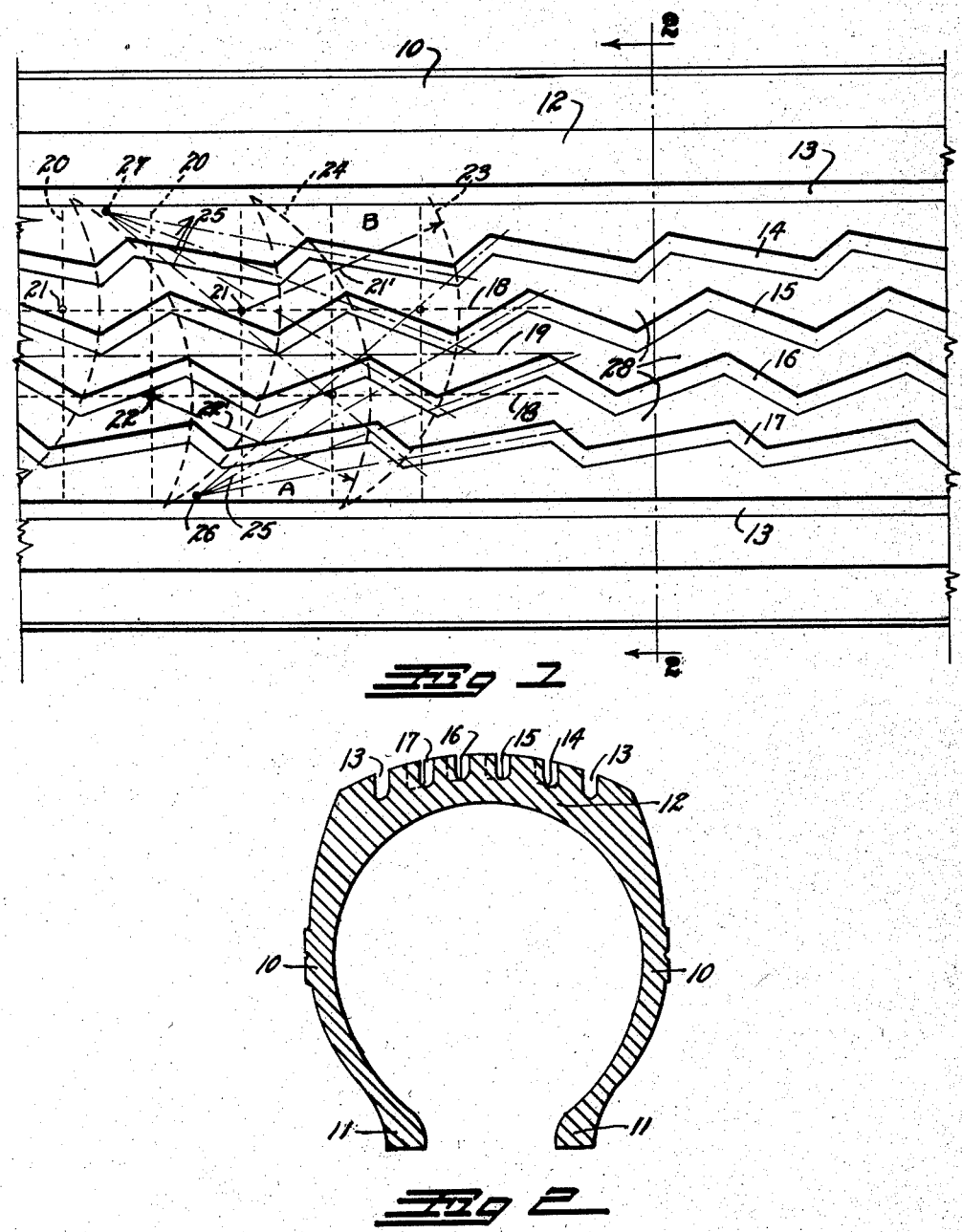

2,424,608

UNITED STATES PATENT OFFICE 2,424,608

TIRE TREAD

Elby Edward French, Denver, Colo., assignor to Harold V. James, Roscoe Turner, and Harold Dutro, as trustees for the O. K. Rubber Welding System, a common-law trust Application November 16, 1943, Serial No. 510,554

6 Claims. (Cl. 152—209)

This invention relates to a tread construction for pneumatic vehicle tires. The principal object of the invention is to provide a tread construction which will give maximum road traction; which will be silent in operation; and which will flex easily under road conditions to prevent uneven wear and overheating.

It is well known that the treads of pneumatic tires produce audible sounds when traveling over hard roads or pavements. These sounds are produced by vibrations caused by regular contacts between portions of the tread design and the road producing a continuous tone or sound vibration. This improved tread is so designed that it will break up the periodicity of sound producing vibrations to reduce the formation of an audible tone without introducing molding complications.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a fragmentary developed plan view of the tread of the improved tire; and Fig. 2 is a cross section therethrough, taken on the line 2—2, Fig. 1.

Portions of a typical tire are designated by numeral in the drawing as follows: side walls 10, beads 11, and crown 12. The cross section of the improved tire forms no part of the present invention, and may take any desired form. This invention is directed solely to the construction of the tread on the crown 12.

The tread is formed by a plurality of relatively deep grooves in the tread portion of the crown 12. These grooves comprise two straight circumferential side grooves 13, there being one side groove at each side of the tread. A plurality of continuous, circumferentially extending angularly bent or zig-zag grooves, such as illustrated at 14, 15, 16 and 17, are formed between the two side grooves 13, no two of which are identical. The grooves 14 to 17 are laid out in accordance with a unique plan and their construction can best be described by outlining the method of laying-out these grooves.

The surface of the tread portion of the tire is divided in a plurality of adjacent areas such as illustrated at A and B in Fig. 1. These areas are outlined by striking arcs 23 and 24 from centers 21 and 22, respectively as indicated by the radius lines 21' and 22'. The centers 21 and 22 are positioned in staggered relation at the points of intersection between a plurality of equally spaced transverse lines 20 and two circumferential lines 18. The lines 18 are positioned equi-distant on each side of the tread center line, indicated at 19.

The above method of layout produces the areas A and B as triangular, curved areas alternating as to direction, that is, the bases of the areas A are along the first side of the tread while their apexes are along the second side thereof while the bases of the alternating areas B are along the said second side and their apexes are along the first side between the bases of the areas A.

The portions of the grooves 14 to 17 lying within the areas A and B are straight and all grooves in the same area incline toward the same side of the tread at differing angles. As the grooves cross the arcs 23 and 24 between the areas A and B they abruptly turn so that all will incline toward the other sides of the tread at differing angles as illustrated.

The "differing angles" are produced by aligning all of the grooves in the areas A with aligning centers 26 along one side of the tread and aligning all the grooves in the areas B with similar aligning centers 27 along the other side thereof as indicated by the radial center lines 25. The centers 26 and 27 alternate in staggered relation along opposite sides of the tread intermediate the lines 20.

The lines 18, 19, 20, 21', 22', 23, 24, and 25 and the center points 21, 22, and 26 are simply for construction and descriptive purposes only. They do not, of course, appear in the tread. The latter appears only as shown in right half of Fig. 1.

It will be noted that the above construction provides a tread in which regular sound producing periodicity is reduced to a minimum. The breaks in any one of the grooves 14 to 17 are not at regular intervals but occur in alternating long and short intervals. Also the breaks in any one groove occur at different circumferential positions than the breaks in any of the other grooves. At no point is any one of the grooves 14 to 17 parallel to any portion of any other groove and at no time do any two of the grooves contact the road at the same angle.

The grooves 14 to 17 outline upstanding plateaus or tread strips 28 between them. These strips are also completely irregular. Their sides are never parallel and the two opposite sides of each strip incline toward each other in the same direction at all points throughout the entire circumference of the tire. This construction also prevents periodicity and produces an extremely flexible tread. The two straight grooves 13 prevent the zig-zag grooves 14 to 17 from imparting any transverse vibration to the tire.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A tire tread construction comprising: a plurality of endless tread strips separated by endless circumferentially extending grooves, each groove being of uniform width throughout its length and consisting of a series of angularly positioned short groove sections extending first toward one side thence toward the other to provide a general zig-zag contour to the grooves, the length and angle of each groove section differing in length and angle from the adjacent groove section of the next adjacent groove so that all groove sections intersecting any given transverse line will differ in length and angle.

2. A tire tread construction comprising: a plurality of endless tread strips separated by endless circumferentially extending grooves, each groove being of uniform width throughout its length and consisting of a series of angularly positioned short groove sections extending first toward one side thence toward the other to provide a general zig-zag contour to the grooves, the length and angle of each groove section differing in length and angle from the adjacent groove section of the next adjacent groove so that all groove sections intersecting any given transverse line will decrease in length and increase in angle as one side of the tire is approached while the adjacent groove sections on each side of said given line will increase in length and decrease in angle as the said side is approached.

3. A tire having a tread composed of four endless tread strips extending circumferentially around the tire, separated by endless circumferentially-extending grooves of uniform width, each groove having a general zig-zag configuration with reference to the plane of said tire, every portion of each groove extending in a different angular direction from any portion of any of the other grooves.

4. A tire having a tread composed of four endless tread strips extending circumferentially around the tire, separated by endless circumferentially-extending grooves of uniform width, each groove consisting of a connected series of straight portions alternating in length and direction, each portion of each groove being non-parallel to any portion of any other groove.

5. A tire having a tread portion defined by two spaced-apart endless grooves extending parallel to the plane of said tire, said tread portion being divided into tread strips by four intermediate grooves extending around the circumference of said tire between said first two grooves, each of said intermediate grooves consisting of alternating long and short sections alternating in direction to produce a zigzag groove axis, the axis of each section of each groove lying at an acute angle with the axis of each section of every other groove.

6. A tire having a tread portion defined by two spaced-apart endless grooves extending parallel to the plane of said tire, said tread portion being divided into tread strips by four intermediate grooves extending around the circumference of said tire between said first two grooves, each of said intermediate grooves consisting of alternating long and short sections alternating in direction to produce a zigzag groove axis, the sections of each groove differing in length and angle from the adjacent sections of the adjacent grooves.

ELBY EDWARD FRENCH.

REFERENCES CITED

The following references are of record in the file of this patent:

UNITED STATES PATENTS

| Number | Name | Date |
|---|---|---|
| D. 103,293 | Allen | Feb. 23, 1937 |
| D. 113,155 | Anderson | Jan. 3, 1939 |
| 808,721 | Bullard | Jan. 2, 1906 |
| 2,124,821 | Hubach | July 26, 1938 |

FOREIGN PATENTS

| Number | Country | Date |
|---|---|---|
| 9,248 | Australia | 1927 |
| 686,949 | France | 1930 |